US006640800B1

(12) United States Patent
Hodgson et al.

(10) Patent No.: US 6,640,800 B1
(45) Date of Patent: Nov. 4, 2003

(54) MULTIPLE FUEL COOKING APPARATUS

(76) Inventors: David A. Hodgson, 29497 Dorsey St., Sun City, CA (US) 92586; Ginny Hodgson, 29497 Dorsey St., Sun City, CA (US) 92586

( * ) Notice: Subject to any disclaimer, the term of this patent is extended or adjusted under 35 U.S.C. 154(b) by 0 days.

(21) Appl. No.: 10/286,724

(22) Filed: Nov. 1, 2002

(51) Int. Cl.[7] .............................. F24C 15/08; F24C 1/02; F24C 3/00
(52) U.S. Cl. ..................... 126/41 R; 126/25 R; 126/50; 126/9 R; 126/36; 99/467
(58) Field of Search ................................. 126/41 R, 50, 126/25 R, 39 C, 39 G, 9 R, 9 B, 19 M, 19 R, 36, 275 R, 304 R, 306; 99/467

(56) References Cited

U.S. PATENT DOCUMENTS

| | | | | |
|---|---|---|---|---|
| 4,457,290 A | * | 7/1984 | Edwards ...................... 126/9 R |
| 4,665,891 A | * | 5/1987 | Nemec et al. ............. 126/25 R |
| 4,819,614 A | | 4/1989 | Hitch |
| 4,869,163 A | | 9/1989 | Haskins |
| 5,099,821 A | | 3/1992 | Ceravolo |
| 5,163,358 A | * | 11/1992 | Hanagan et al. ............... 99/339 |
| 5,184,599 A | | 2/1993 | Stuart |
| 5,189,945 A | * | 3/1993 | Hennick ....................... 99/339 |
| 5,203,316 A | * | 4/1993 | Pritchett ...................... 126/29 |
| 5,460,159 A | * | 10/1995 | Bussey ....................... 126/25 R |
| 5,528,984 A | * | 6/1996 | Saurwein ...................... 99/482 |
| 5,711,209 A | * | 1/1998 | Guines ........................ 99/339 |
| 5,819,720 A | | 10/1998 | Schubert |
| 5,865,100 A | * | 2/1999 | Knowles ...................... 99/340 |
| D406,490 S | | 3/1999 | Daniels et al. |
| 5,878,739 A | | 3/1999 | Guidry |
| 5,934,184 A | * | 8/1999 | Schlosser et al. ............. 99/385 |
| 5,967,134 A | * | 10/1999 | Harris ....................... 126/41 R |
| 6,039,039 A | * | 3/2000 | Pina, Jr. ................... 126/25 R |
| 6,209,533 B1 | * | 4/2001 | Ganard ..................... 126/25 R |
| 2003/0010332 A1 | * | 1/2003 | Mosher et al. ................. 126/38 |
| 2003/0019492 A1 | * | 1/2003 | Williams ................... 126/41 R |

* cited by examiner

*Primary Examiner*—Henry Bennett
*Assistant Examiner*—Kathryn Ferko (57) ABSTRACT

A the cooking apparatus for cooking food. The the cooking apparatus includes a body member comprising a perimeter wall. The perimeter wall defines an interior space of the body member. The interior space of the body member comprises an open end for permitting at least one heat source to be inserted into the interior space of the body member. A grill member is selectively coupled to the body member whereby the grill member is positioned over the interior space of the body member for supporting food to be cooked by the heat source positioned in the interior space. An oven assembly is selectively coupled to the body member. The oven assembly is positioned over the interior space of the body member for receiving food to be baked by the heat source positioned in the interior space of the body member.

20 Claims, 10 Drawing Sheets

MULTIPLE FUEL COOKING APPARATUS

BACKGROUND OF THE INVENTION

1. Field of the Invention

The present invention relates to barbecue grills and more particularly pertains to a new the cooking apparatus for cooking food.

2. Description of the Prior Art

The use of barbecue grills is known in the prior art. U.S. Pat. No. 4,819,614 describes a device for using either gas or charcoal briquettes to cook food. Another type of barbecue grill is U.S. Pat. No. 5,878,739 has a grill capable of using both gas and charcoal with an adjustable height burner. U.S. Pat. No. 5,099,821 has a barbecue grill having multiple chambers for separating the heat source, the ashes and the food during cooking. U.S. Pat. No. 5,184,599 has a self contained cooker and grill for cooking food. U.S. Pat. No. 4,869,163 has a stand being couplable to a portable grill for securing a portable grill in a raised position above the ground. U.S. Pat. No. 4,869,163 has a smoking unit to be used with gas grills to allow a user to smoke foods. U.S. Pat. No. Des. 406,490 shows a barbecue grill.

While these devices fulfill their respective, particular objectives and requirements, the need remains for a device that has certain improved features allow a user to bake items.

SUMMARY OF THE INVENTION

The present invention meets the needs presented above by providing an oven assembly that is positionable over the interior space of the body member so that heat radiating from the heat source heats the oven assembly to cook food.

Still yet another object of the present invention is to provide a new the cooking apparatus that allows the user to pack the external items into the interior space of the body member to facilitate storage when not in use.

Even still another object of the present invention is to provide a new the cooking apparatus that allows the user to use gas as well as charcoal briquettes or smoking chips.

To this end, the present invention generally comprises a body member comprising a perimeter wall. The perimeter wall defines an interior space of the body member. The interior space of the body member comprises an open end whereby the open end of the interior space is designed for permitting at least one heat source to be inserted into the interior space of the body member. A grill member is selectively coupled to the body member whereby the grill member is positioned over the interior space of the body member. The grill member is designed for supporting food to be cooked by the heat source positioned in the interior space of the body members. An oven assembly is selectively coupled to the body member whereby the oven assembly is positioned adjacent the grill member. The oven assembly is positioned over the interior space of the body member whereby the oven assembly is designed for receiving food to be baked by the heat source positioned in the interior space of the body member. The oven assembly may be positioned in the interior space of the body member to facilitate storage of the oven assembly when food is not be cooked.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
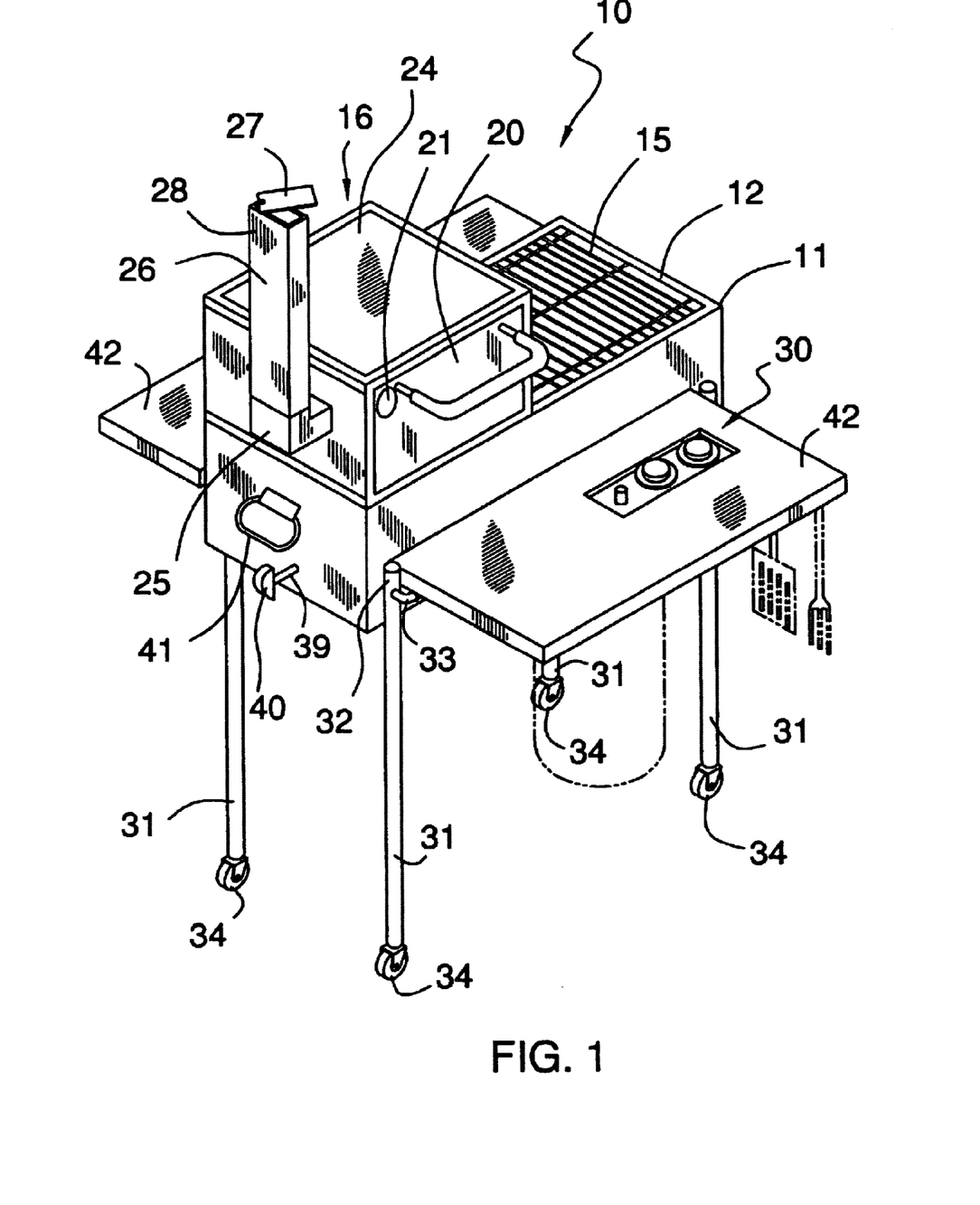
FIG. 1 is a perspective view of a new the cooking apparatus according to the present invention.
Figure 2:
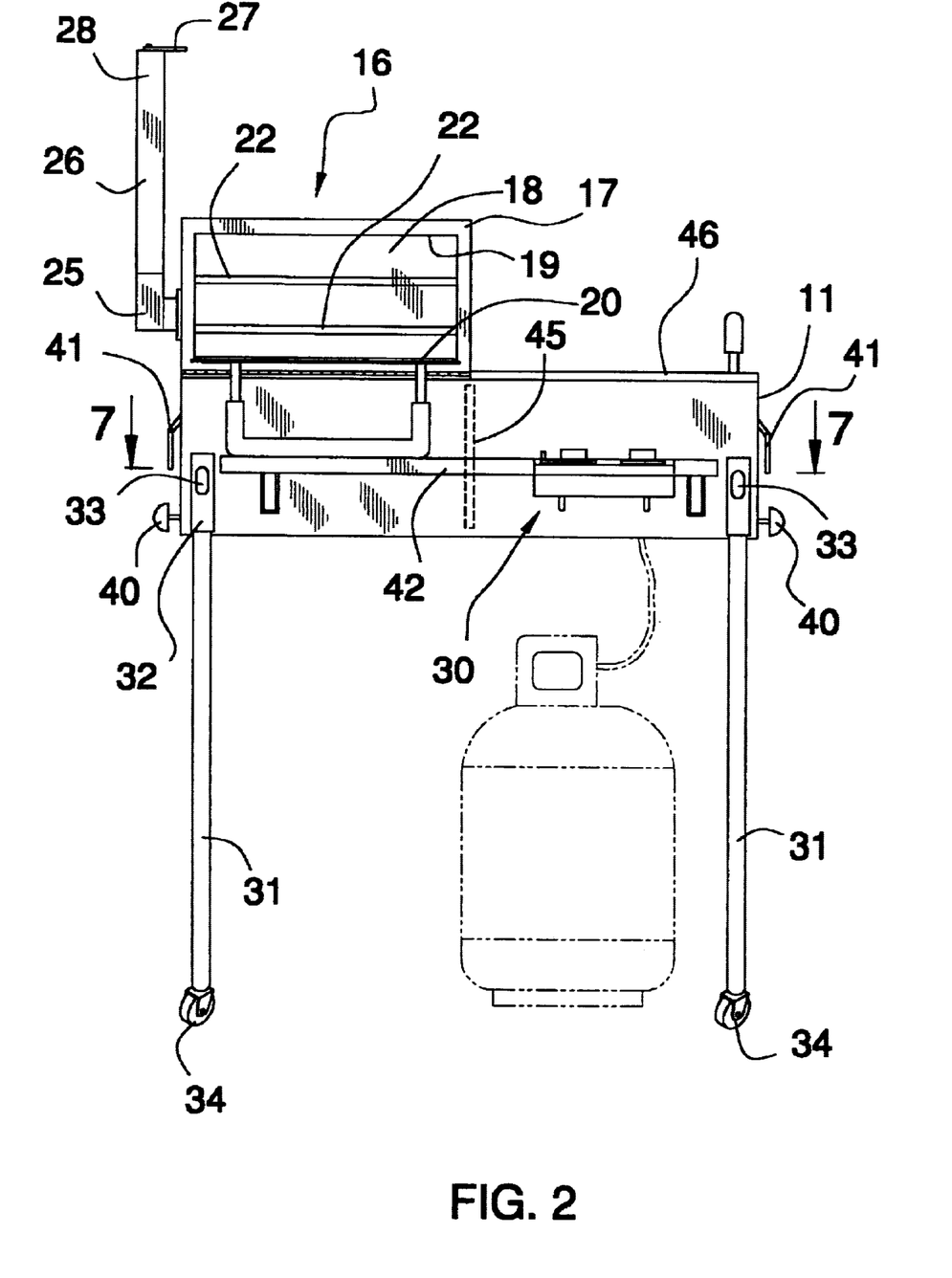
FIG. 2 is a front view of the present invention.
Figure 3:
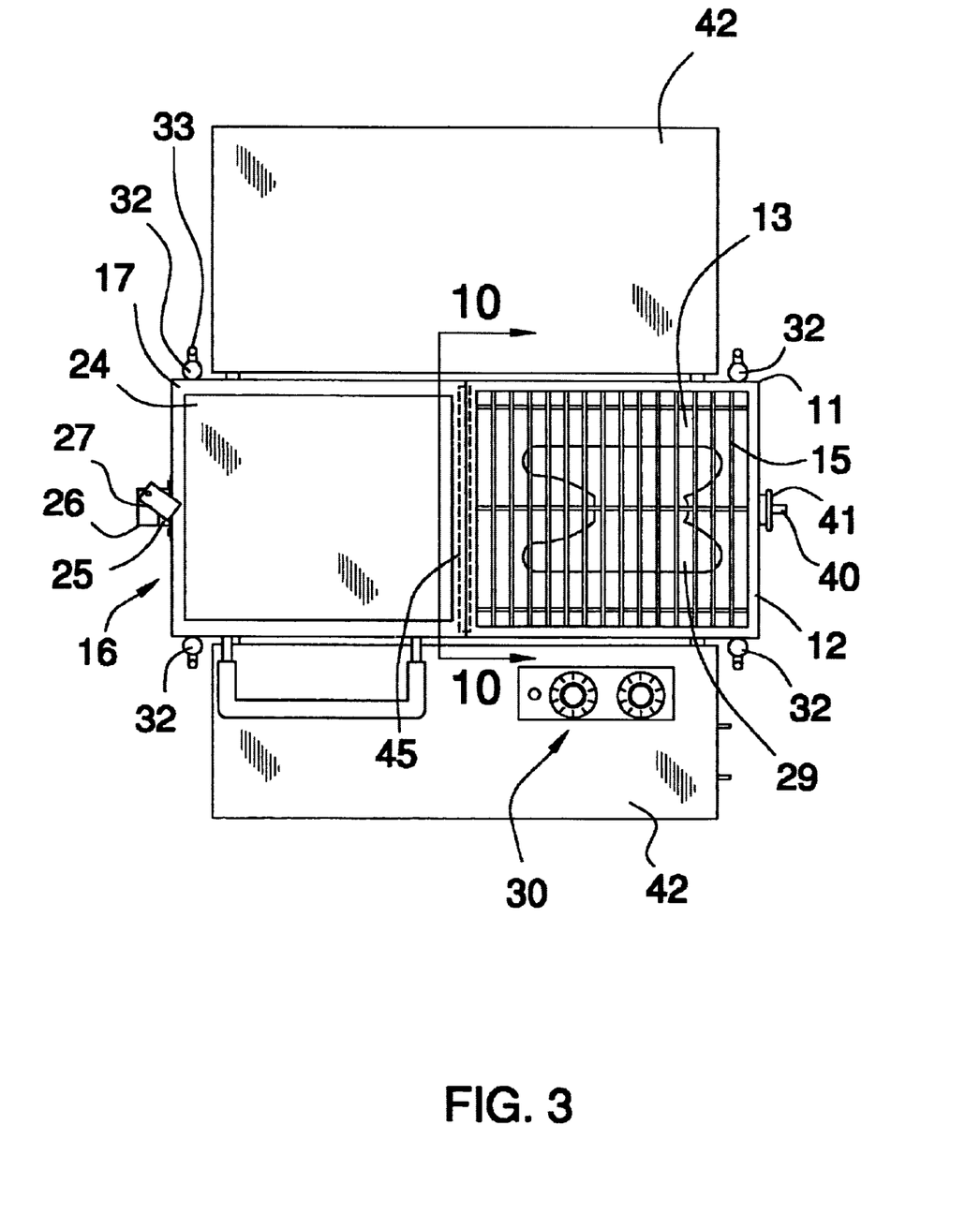
FIG. 3 is a top view of the present invention.
Figure 4:
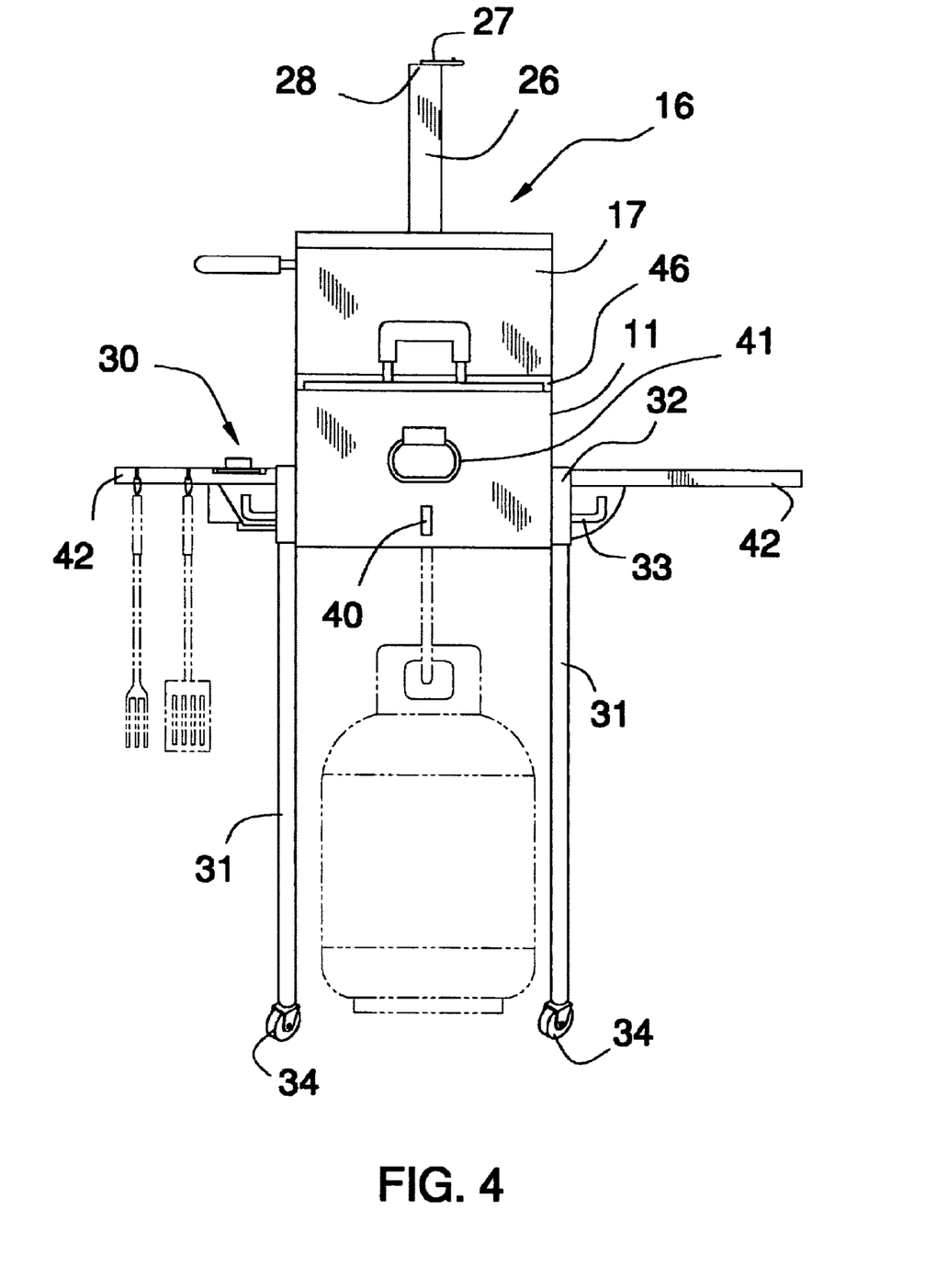
FIG. 4 is a right side view of the present invention.
Figure 5:
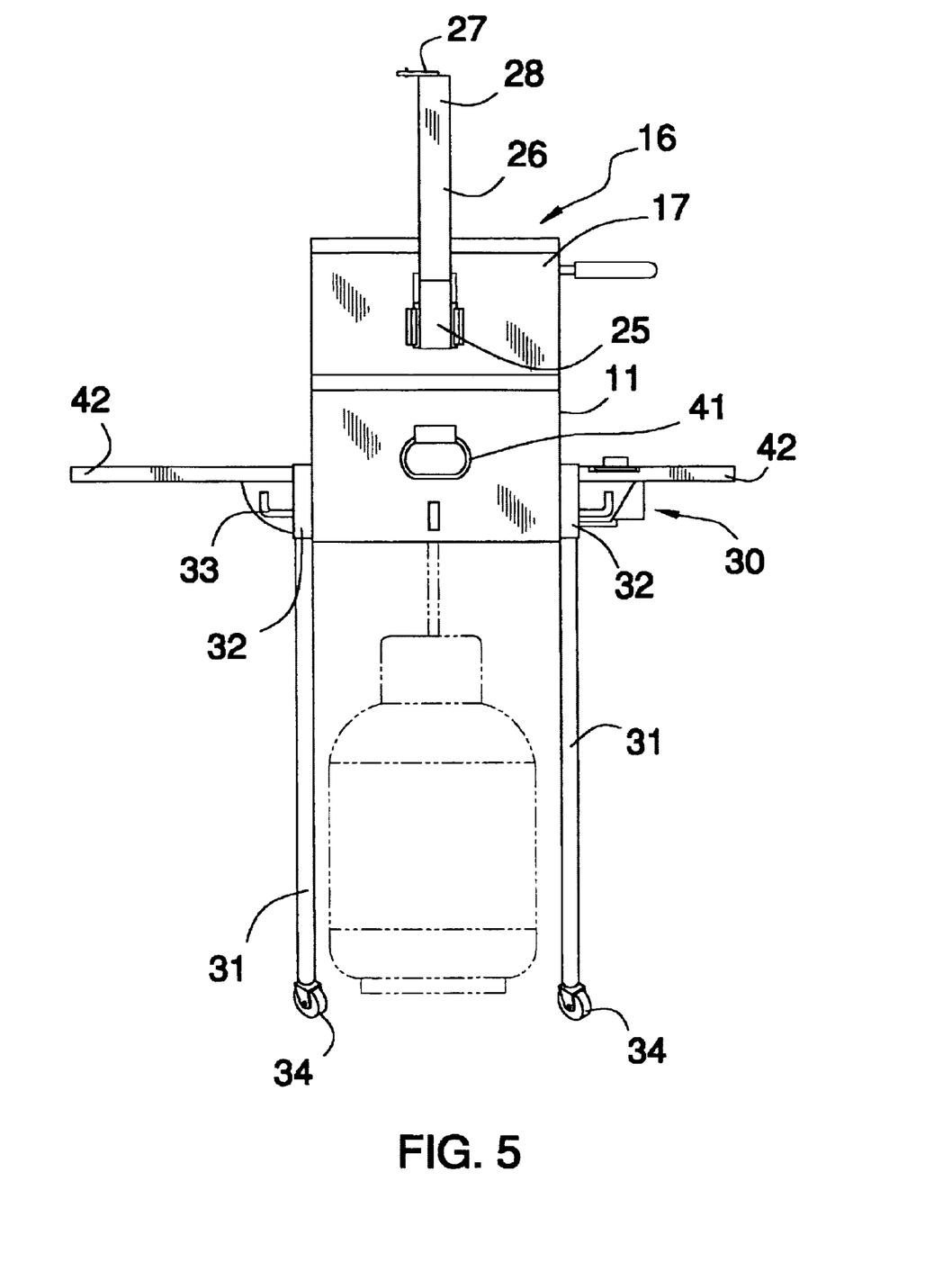
FIG. 5 is a left side view of the present invention.
Figure 6:
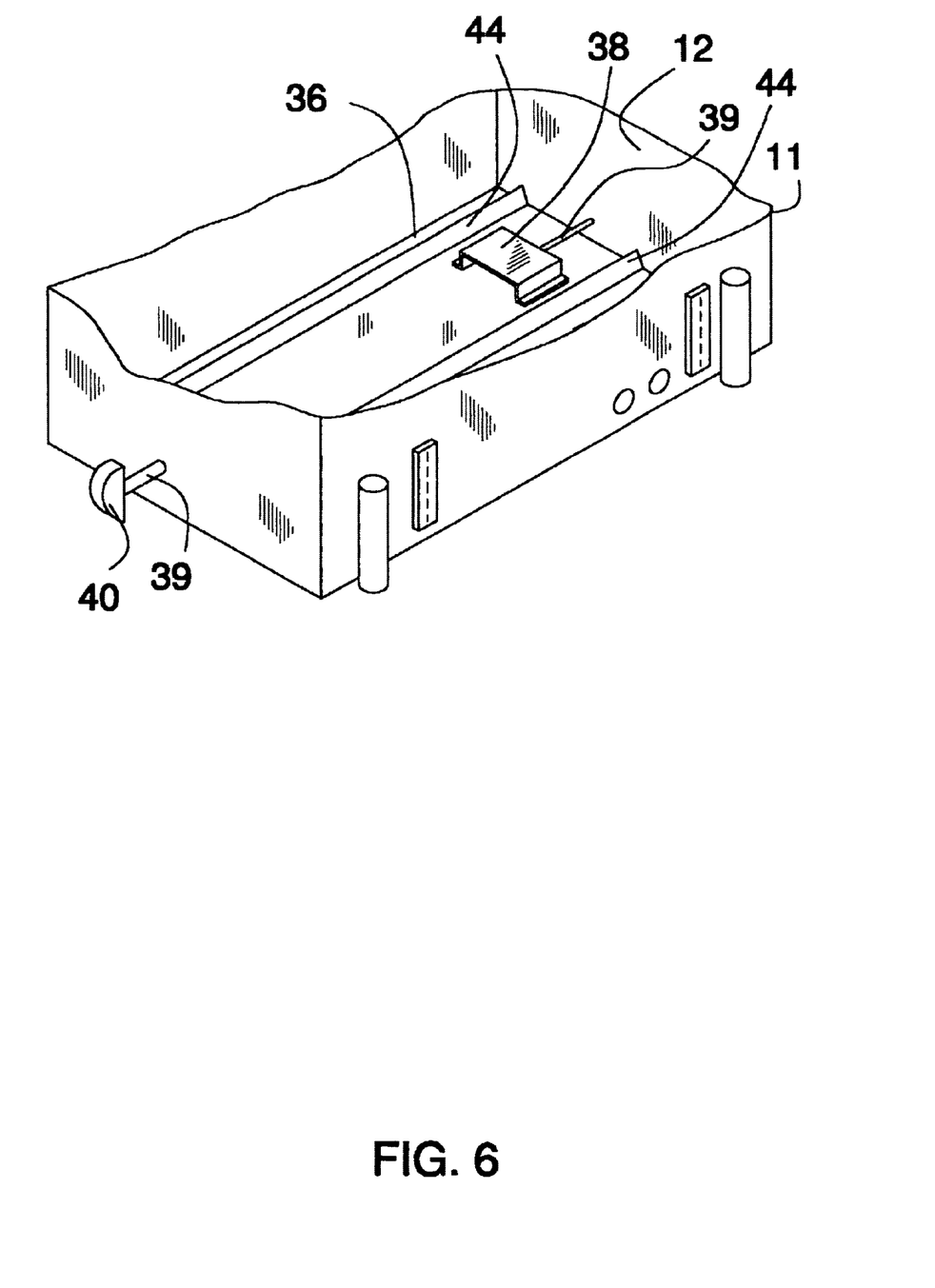
FIG. 6 is a partial cross-sectional view of the body member of the present invention.
Figure 7:
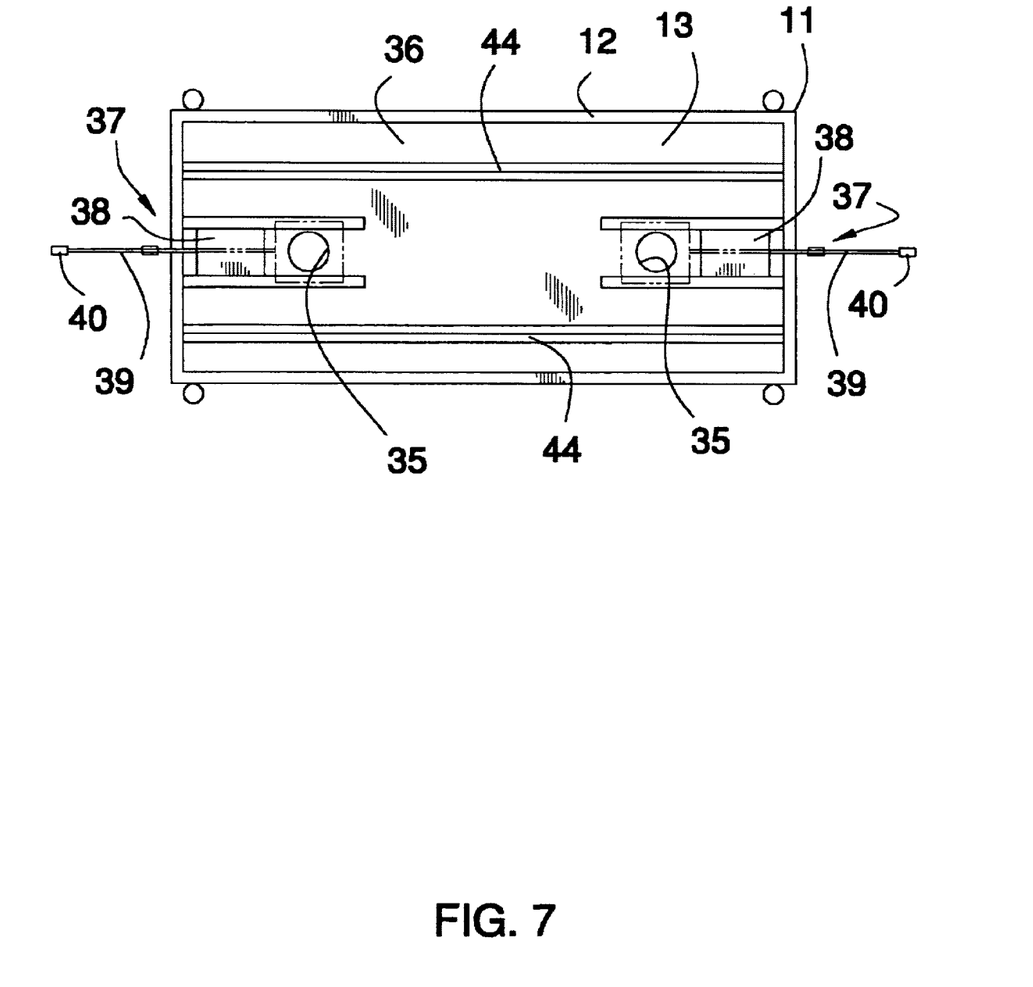
FIG. 7 is a cross-sectional view of the interior space of the body member of the present invention taken along line 7—7 of FIG. 2.
Figure 8:
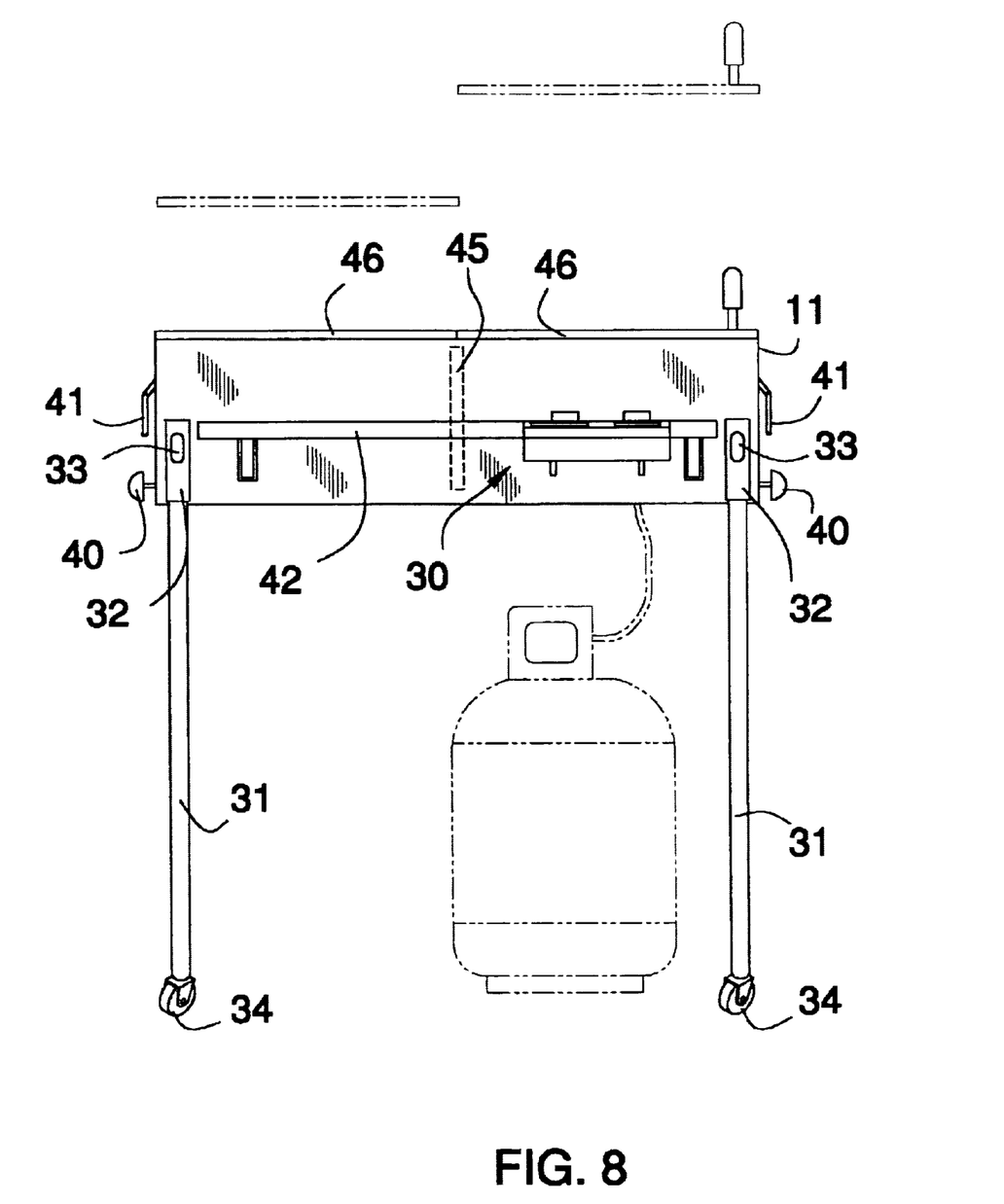
FIG. 8 is a front view of the present invention without the oven assembly.
Figure 9:
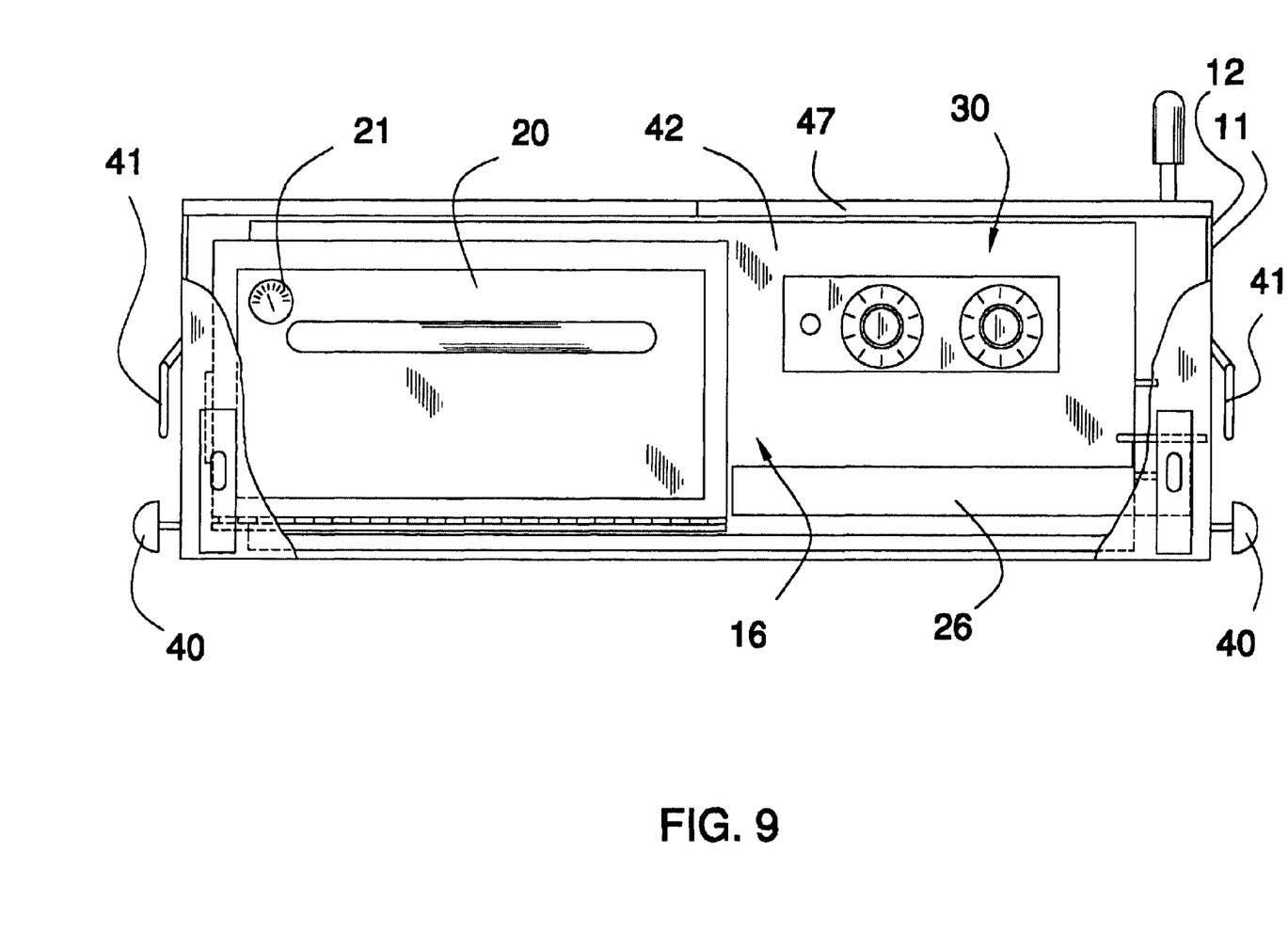
FIG. 9 is a partial cross-sectional view of the present invention shown with the external item in the interior space of the body member.
Figure 10:
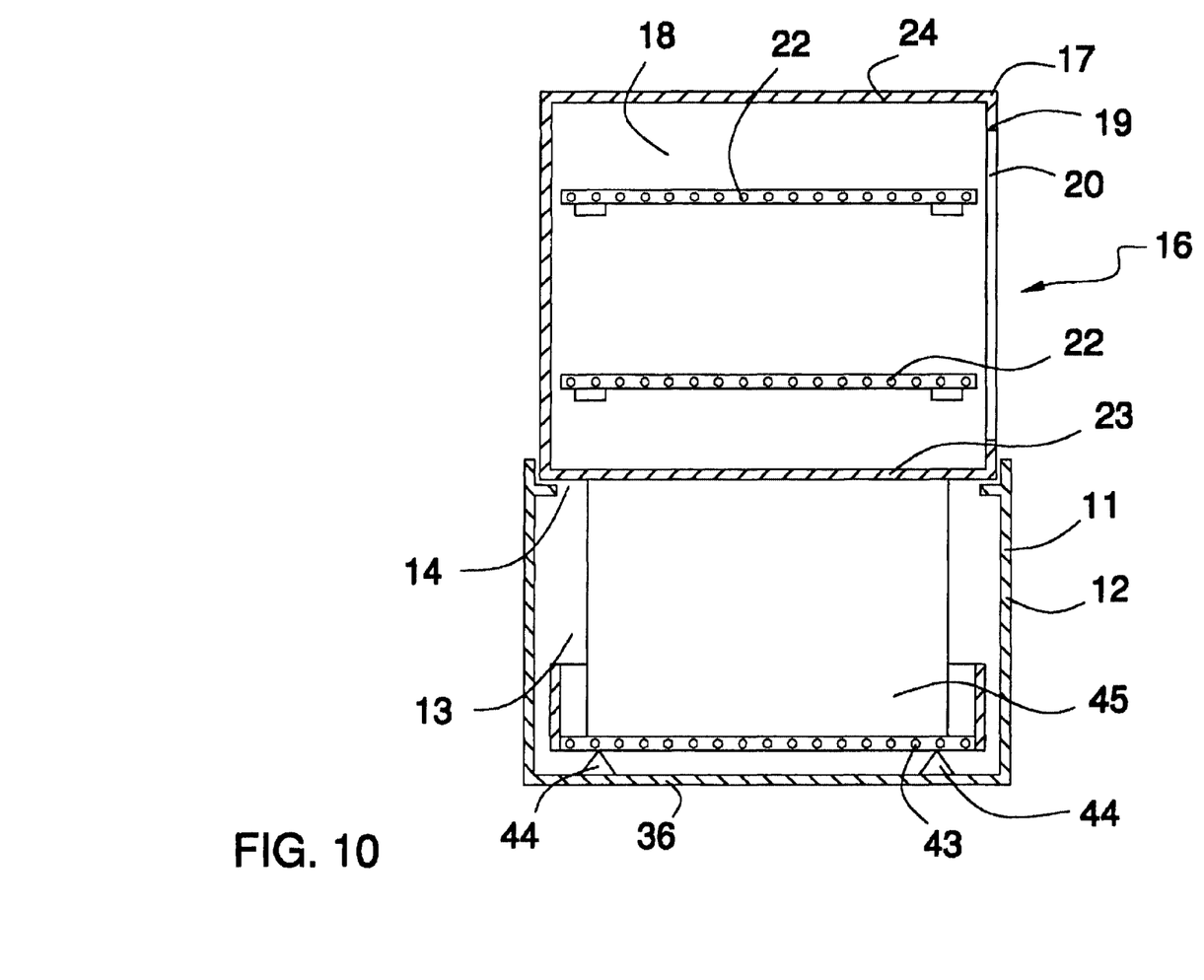
FIG. 10 is a cross-sectional view of the present invention taken along line 10—10 of FIG. 3.

With reference now to the drawings, and in particular to FIGS. 1 through 10 thereof, a new the cooking apparatus embodying the principles and concepts of the present invention and generally designated by the reference numeral 10 will be described.

As best illustrated in FIGS. 1 through 10, the the cooking apparatus 10 generally comprises a body member 11 comprising a perimeter wall 12. The perimeter wall 12 defines an interior space 13 of the body member 11. The interior space 13 of the body member 11 comprises an open end 14 whereby the open end 14 of the interior space 13 is designed for permitting at least one heat source to be inserted into the interior space 13 of the body member 11. The heat source may comprise charcoal briquettes or wood to provide a smoker effect.

A grill member 15 is selectively coupled to the body member 11 whereby the grill member 15 is positioned over the interior space 13 of the body member 11. The grill member 15 is designed for supporting food to be cooked by the heat source positioned in the interior space 13 of the body member 11s.

An oven assembly 16 is selectively coupled to the body member 11 whereby the oven assembly 16 is positioned adjacent the grill member 15. The oven assembly 16 is positioned over the interior space 13 of the body member 11 whereby the oven assembly 16 is designed for receiving food to be baked by the heat source positioned in the interior space 13 of the body member 11. The oven assembly 16 may be positioned in the interior space 13 of the body member 11 to facilitate storage of the oven assembly 16 when food is not be cooked.

The oven assembly 16 comprises a peripheral wall 17 defining a baking space 18 of the oven assembly 16. The peripheral wall 17 of the oven assembly 16 comprises an insertion aperture 19 whereby the insertion aperture 19 is designed for permitting food to be baked to be inserted into the baking space 18 of the oven assembly 16.

The oven assembly 16 comprises a door member 20. The door member 20 is hingably coupled to the peripheral wall 17 proximate the insertion aperture 19 of the oven assembly 16. The door member 20 is selectively pivotable over the insertion aperture 19 for selectively inhibiting access to the baking space 18 of the oven assembly 16 when the door member 20 is pivoted over the insertion aperture 19.

The oven assembly 16 comprises a temperature indicator 21. The temperature indicator 21 is coupled to the door member 20 of the oven assembly 16. The temperature indicator 21 is designed for indicating the temperature in the baking space 18 when the door member 20 is positioned over the insertion aperture 19.

The oven assembly 16 comprises a plurality of rack members 22. Each of the rack members 22 is insertable through the insertion aperture 19 and positioned in the baking space 18 of the oven assembly 16. Each of the rack members 22 selectively engages the peripheral wall 17 for being positioned in a spaced relationship in the baking space 18 of the oven assembly 16. Each of the rack members 22 is designed for selectively supporting food positioned in the baking space 18 for baking.

The peripheral wall 17 of the oven assembly 16 comprises a lower wall 23. The lower wall 23 is positioned over the interior space 13 of the body member 11 whereby the lower wall 23 is designed for being heated by the heat source positioned in the interior space 13 of the body member 11. The lower wall 23 is designed for radiating heat into the baking space 18 of the oven assembly 16 to bake food positioned in the baking space 18 when the lower wall 23 is heated by the heat source positioned in the interior space 13. An upper wall 24 of the peripheral wall 17 being designed to act as a steam table when the baking space 18 has been heated.

The oven assembly 16 comprises a venting portion 25. The venting portion 25 is coupled to the peripheral wall 17 of the oven assembly 16. The venting portion 25 is designed for being in fluid communication with the baking space 18 of the oven assembly 16 whereby the venting portion 25 is for venting gases and heat from the baking space 18 to the environment.

The oven assembly 16 comprises a stack member 26. The stack member 26 is selectively coupled to the venting portion 25 of the oven assembly 16. The stack member 26 is in fluid communication with the venting portion 25 whereby the stack member 26 is designed for venting gases and heat away from the user when the gases and heat are vented through the venting portion 25.

The oven assembly 16 comprises a flue control member 27. The flue control member 27 is pivotally coupled to a free end 28 of the stack member 26. The flue control member 27 is selectively pivoted over the free end 28 of the stack member 26 whereby the flue control member 27 is designed for control the amount of gasses and heat being vented through the stack member 26.

A burner member 29 is positioned in the interior space 13 of the body member 11. The burner member 29 is designed for being operationally coupled to a gas supply whereby the burner member 29 is for controlling the burning of the gas to provide heat to cook food.

A gas control assembly 30 is operationally coupled to the burner member 29 whereby the gas control assembly 30 is designed for being operationally coupled between the burner member 29 and the gas supply. The gas control assembly 30 is designed for controlling the flow of gas from the gas supply to the burner member 29 when the gas control assembly 30 is actuated by the user.

A plurality of leg members 31 are selectively coupled to the perimeter wall 12 of the body member 11. Each of the leg members 31 is designed for positioning the body member 11 above a support surface.

The body member 11 comprises a plurality of sleeve members 32. Each of the sleeve members 32 is coupled to the perimeter wall 12 of the body member 11. Each of the sleeve members 32 selectively receives one of the leg members 31 whereby the leg members 31 are removable for facilitating storage. The leg members 31 may be positioned in the interior space 13 of the body member 11 when the body member 11 is to be stored.

The body member 11 comprises a plurality of locking members 33. Each of the locking members 33 selectively extends into one of the sleeve members 32 of the body member 11. Each of the locking members 33 selectively engages one of the leg members 31 positioned in the associated one of the sleeve members 32 when the locking member is extending into the associated one of the sleeve members 32.

Each of the leg members 31 comprises a wheel portion 34. The wheel portion 34 is positioned opposite the body member 11 when that associated one of the leg members 31 is coupled to the body member 11. The wheel of each of the leg members 31 is designed for rolling across the support surface for facilitating moving of the body member 11.

The perimeter wall 12 of the body member 11 comprises a plurality of intake apertures 35. Each of the intake apertures 35 extends through a bottom wall 36 of the perimeter wall 12 of the body member 11. Each of the intake apertures 35 is designed for permitting air to be drawn into the interior space 13 of the body member 11 to supply the heat source with oxygen.

A plurality of damper assemblies 37 are slidably coupled to the bottom wall 36 of the perimeter wall 12 of the body member 11. Each of the damper assemblies 37 is positioned proximate one of the intake apertures 35 whereby each of the damper assemblies 37 is designed for controlling the amount of air being drawn through the associated one of the intake apertures 35 when each of the damper assemblies 37 is actuated by the user.

Each of the damper assemblies 37 comprises a damper plate 38. The damper plate 38 is sildably coupled to the bottom wall 36 of the perimeter wall 12 of the body member 11. The damper plate 38 is selectively slid over the associated one of the intake apertures 35 whereby the damper plate 38 is designed for controlling the amount air being drawn through the associated one of the intake apertures 35 when the damper plate 38 is actuated by the user.

Each the damper assemblies 37 comprises a rod member 39 and a damper handle member 40. The rod member 39 is coupled to the damper plate 38 of the associated one of the damper plate 38s. The rod member 39 slidably extends through the perimeter wall 12 of the body member 11. The damper handle member 40 is coupled to the rod member 39 opposite the damper plate 38 whereby the damper handle member 40 is designed for being gripped by the user to allow the user to slide the damper plate 38 to control the amount of air flowing through the associated one of the intake apertures 35.

A plurality of lifting handles 41 are coupled to the perimeter wall 12 of the body member 11. Each of the lifting handles 41 is designed for being gripped by the hands of the user for lifting and transporting the body member 11.

A pair of shelf members 42 is selectively coupled to the perimeter wall 12 of the body member 11 whereby one of the shelf members 42 is positioned opposite the other one of the shelf members 42. The gas control assembly 30 is coupled to one of the shelf members 42. Each of the shelf members 42 is designed for supporting articles used by the user when the shelf members 42 are coupled to the body member 11. Each of the shelf members 42 may be inserted into the interior space 13 of the body member 11 to facilitate storage of the body member 11.

A grate member 43 is selectively positioned in the interior space 13 of the body member 11. The grate member 43 is designed for supporting the burner member 29 and the heat source in the interior space 13 of the body member 11.

The body member 11 comprises a plurality of rib members 44. Each of the rib members 44 is coupled to the bottom wall 36 of the perimeter wall 12 of the body member 11 whereby each of the rib members 44 is positioned in the interior space 13 of the body member 11. The rib members 44 are positioned between the bottom wall 36 and the grate member 43 whereby the rib members 44 are for positioning the grate member 43 in a spaced relationship from the intake apertures 35 for allowing air to flow to the burner member 29 and the heat source.

A separating plate 45 is selectively inserted into the interior space 13 of the body member 11. The separating plate 45 is designed for separating the heat source from the burner member 29 when the separating plate 45 is positioned in the interior space 13.

A lid member 46 is selectively positioned over the open end 14 of the interior space 13 of the body member 11 for selectively closing the open end 14 of the interior space 13. The lid member 46 is designed for retaining heat within the interior space 13 of the body member 11 when the heat source is being used in the interiors space. The lid member 46 is also for concealing the oven assembly 16, the shelf members 42, gas control assembly 30 when they are positioned in the interior space 13 of the body member 11.

In use, the user places each of the leg members 31 into one of the sleeve members 32 of the body member 11. The locking members 33 are then used to secure the leg members 31 in the associated one of the sleeve members 32. Each of the shelf members 42 is then removed from the interior space 13 and coupled to the body member 11. The gas control assembly 30 is then coupled to the gas supply and the burner member 29s. The oven assembly 16 is then removed from the interior space 13 and the oven assembly 16 is placed onto the body member 11 so that the oven assembly 16 is positioned over the interior space 13. The heat source is placed into the interior space 13 and lit. The separating plate 45 is then placed into the interior space 13 to separate the heat source from the burner member 29. The grill member 15 is then placed over the interior space 13 and the burner member 29 is then ignited using an igniter of the gas control assembly 30 and the amount of gas supplied to the burner member 29 is controlled by dials of the gas control assembly 30. The user can then cook food on the grill member 15 and bake food in the oven assembly 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cooking apparatus for cooking food by a user, the cooking apparatus comprising:

a body member comprising a perimeter wall, said perimeter wall defining an interior space of said body member, said interior space of said body member comprising an open end such that said open end of said interior space is adapted for permitting at least one heat source to be inserted into said interior space of said body member;

a grill member being selectively coupled to said body member such that said grill member is positioned over said interior space of said body member, said grill member being adapted for supporting food to be cooked by the heat source positioned in said interior space of said body members;

an oven assembly being selectively coupled to said body member such that said oven assembly is positioned adjacent said grill member, said oven assembly being positioned over said interior space of said body member such that said oven assembly is adapted for receiving food to be baked by the heat source positioned in said interior space of said body members;

a burner member being positioned in said interior space of said body member, said burner member being adapted for being operationally coupled to a gas supply such that said burner member is for controlling the burning of the gas to provide heat to cook food; and a separating plate being selectively inserted into said interior space of said body member such that said separating plate extends between said open end of said interior space of said body member and said perimeter wall of said body member, said separating plate being adapted for separating the heat source from said burner member when said separating plate is positioned in said interior space.

2. The cooking apparatus as set forth in claim 1, further comprising:

said oven assembly comprising a peripheral wall defining a baking space of said oven assembly, said peripheral wall of said oven assembly comprising an insertion aperture such that said insertion aperture is adapted for permitting food to be baked to be inserted into said baking space of said oven assembly.

3. The cooking apparatus as set forth in claim 2, further comprising:

said oven assembly comprising a door member, said door member being hingably coupled to said peripheral wall proximate said insertion aperture of said oven assembly, said door member being selectively pivotable over said insertion aperture for selectively inhibiting access to said baking space of said oven assembly when said door member is pivoted over said insertion aperture.

4. The cooking apparatus as set forth in claim 3, further comprising:

said oven assembly comprising a temperature indicator, said temperature indicator being coupled to said door member of said oven assembly, said temperature indicator being adapted for indicating the temperature in said baking space when said door member is positioned over said insertion aperture.

5. The cooking apparatus as set forth in claim 2, further comprising:
said oven assembly comprising a plurality of rack members, each of said rack members being insertable through said insertion aperture and positioned in said baking space of said oven assembly, each of said rack members selectively engaging said peripheral wall for being positioned in a spaced relationship in said baking space of said oven assembly, each of said rack members being adapted for selectively supporting food positioned in said baking space for baking.

6. The cooking apparatus as set forth in claim 2, further comprising:
said peripheral wall of said oven assembly comprising a lower wall, said lower wall being positioned over said interior space of said body member such that said lower wall is adapted for being heated by the heat source positioned in said interior space of said body member, said lower wall being adapted for radiating heat into said baking space of said oven assembly to bake food positioned in said baking space when said lower wall is heated by the heat source positioned in said interior space.

7. The cooking apparatus as set forth in claim 2, further comprising:
said oven assembly comprising a venting portion, said venting portion being coupled to said peripheral wall of said oven assembly, said venting portion being adapted for being in fluid communication with said baking space of said oven assembly such that said venting portion is for venting gases and heat from said baking space to the environment.

8. The cooking apparatus as set forth in claim 7, further comprising:
said oven assembly comprising a stack member, said stack member being selectively coupled to said venting portion of said oven assembly, said stack member being in fluid communication with said venting portion such that said stack member is adapted for venting gases and heat away from the user when the gases and heat are vented through said venting portion.

9. The cooking apparatus as set forth in claim 8, further comprising:
said oven assembly comprising a flue control member, said flue control member being pivotally coupled to a free end of said stack member, said flue control member being selectively pivoted over said free end of said stack member such that said flue control member is adapted for control the amount of gasses and heat being vented through said stack member.

10. The cooking apparatus as set forth in claim 1, further comprising:
a burner member being positioned in said interior space of said body member, said burner member being adapted for being operationally coupled to a gas supply such that said burner member is for controlling the burning of the gas to provide heat to cook food.

11. The cooking apparatus as set forth in claim 1, further comprising:
a gas control assembly being operationally coupled to said burner member such that said gas control assembly is adapted for being operationally coupled between said burner member and the gas supply, said gas control assembly being adapted for controlling the flow of gas from said gas supply to said burner member when said gas control assembly is actuated by the user.

12. The cooking apparatus as set forth in claim 1, further comprising:
a plurality of leg members being selectively coupled to said perimeter wall of said body member, each of said leg members being adapted for positioning said body member above a support surface.

13. The cooking apparatus as set forth in claim 12, further comprising:
said body member comprising a plurality of sleeve members, each of said sleeve members being coupled to said perimeter wall of said body member, each of said sleeve members selectively receiving one of said leg members such that said leg members are removable for facilitating storage.

14. The cooking apparatus as set forth in claim 13, further comprising:
said body member comprising a plurality of locking members, each of said locking members selectively extending into one of said sleeve members of said body member, each of said locking members selectively engaging one of the leg members positioned in the associated one of said sleeve members when said locking member is extending into the associated one of said sleeve members.

15. The cooking apparatus as set forth in claim 12, further comprising:
each of said leg members comprising a wheel portion, said wheel portion being positioned opposite said body member when that associated one of said leg members is coupled to said body member, said wheel of each of said leg members being adapted for rolling across the support surface for facilitating moving of said body member.

16. The cooking apparatus as set forth in claim 1, further comprising:
said perimeter wall of said body member comprising a plurality of intake apertures, each of said intake apertures extending through a bottom wall of said perimeter wall of said body member, each of said intake apertures being adapted for permitting air to be drawn into said interior space of said body member to supply the heat source with oxygen.

17. The cooking apparatus as set forth in claim 16, further comprising:
a plurality of damper assemblies being slidably coupled to said bottom wall of said perimeter wall of said body member, each of said damper assemblies being positioned proximate one of said intake apertures such that each of said damper assemblies is adapted for controlling the amount of air being drawn through the associated one of said intake apertures when each of said damper assemblies is actuated by the user.

18. The cooking apparatus as set forth in claim 17, further comprising:
each of said damper assemblies comprising a damper plate, said damper plate being sildably coupled to said bottom wall of said perimeter wall of said body member, said damper plate being selectively slid over the associated one of said intake apertures such that said damper plate is adapted for controlling the amount air being drawn through the associated one of said intake apertures when said damper plate is actuated by the user.

19. The cooking apparatus as set forth in claim 18, further comprising:

each said damper assemblies comprising a rod member and a damper handle member, said rod member being coupled to said damper plate of the associated one of said damper plates, said rod member slidably extending through said perimeter wall of said body member, said damper handle member being coupled to said rod member opposite said damper plate such that said damper handle member is adapted for being gripped by the user to allow the user to slide said damper plate to control the amount of air flowing through the associated one of said intake apertures.

20. A cooking apparatus for cooking food by a user, the cooking apparatus comprising:

a body member comprising a perimeter wall, said perimeter wall defining an interior space of said body member, said interior space of said body member comprising an open end such that said open end of said interior space is adapted for permitting at least one heat source to be inserted into said interior space of said body member;

a grill member being selectively coupled to said body member such that said grill member is positioned over said interior space of said body member, said grill member being adapted for supporting food to be cooked by the heat source positioned in said interior space of said body members;

an oven assembly being selectively coupled to said body member such that said oven assembly is positioned adjacent said grill member, said oven assembly being positioned over said interior space of said body member such that said oven assembly is adapted for receiving food to be baked by the heat source positioned in said interior space of said body member;

said oven assembly comprising a peripheral wall defining a baking space of said oven assembly, said peripheral wall of said oven assembly comprising an insertion aperture such that said insertion aperture is adapted for permitting food to be baked to be inserted into said baking space of said oven assembly;

said oven assembly comprising a door member, said door member being hingably coupled to said peripheral wall proximate said insertion aperture of said oven assembly, said door member being selectively pivotable over said insertion aperture for selectively inhibiting access to said baking space of said oven assembly when said door member is pivoted over said insertion aperture;

said oven assembly comprising a temperature indicator, said temperature indicator being coupled to said door member of said oven assembly, said temperature indicator being adapted for indicating the temperature in said baking space when said door member is positioned over said insertion aperture;

said oven assembly comprising a plurality of rack members, each of said rack members being insertable through said insertion aperture and positioned in said baking space of said oven assembly, each of said rack members selectively engaging said peripheral wall for being positioned in a spaced relationship in said baking space of said oven assembly, each of said rack members being adapted for selectively supporting food positioned in said baking space for baking;

said peripheral wall of said oven assembly comprising a lower wall, said lower wall being positioned over said interior space of said body member such that said lower wall is adapted for being heated by the heat source positioned in said interior space of said body member, said lower wall being adapted for radiating heat into said baking space of said oven assembly to bake food positioned in said baking space when said lower wall is heated by the heat source positioned in said interior space;

said oven assembly comprising a venting portion, said venting portion being coupled to said peripheral wall of said oven assembly, said venting portion being adapted for being in fluid communication with said baking space of said oven assembly such that said venting portion is for venting gases and heat from said baking space to the environment;

said oven assembly comprising a stack member, said stack member being selectively coupled to said venting portion of said oven assembly, said stack member being in fluid communication with said venting portion such that said stack member is adapted for venting gases and heat away from the user when the gases and beat are vented through said venting portion;

said oven assembly comprising a flue control member, said flue control member being pivotally coupled to a free end of said stack member, said flue control member being selectively pivoted over said free end of said stack member such that said flue control member is adapted for control the amount of gasses and heat being vented through said stack member;

a burner member being positioned in said interior space of said body member, said burner member being adapted for being operationally coupled to a gas supply such that said burner member is for controlling the burning of the gas to provide heat to cook food;

a gas control assembly being operationally coupled to said burner member such that said gas control assembly is adapted for being operationally coupled between said burner member and the gas supply, said gas control assembly being adapted for controlling the flow of gas from said gas supply to said burner member when said gas control assembly is actuated by the user;

a plurality of leg members being selectively coupled to said perimeter wall of said body member, each of said leg members being adapted for positioning said body member above a support surface;

said body member comprising a plurality of sleeve members, each of said sleeve members being coupled to said perimeter wall of said body member, each of said sleeve members selectively receiving one of said leg members such that said leg members are removable for facilitating storage;

said body member comprising a plurality of locking members, each of said locking members selectively extending into one of said sleeve members of said body member, each of said locking members selectively engaging one of the leg members positioned in the associated one of said sleeve members when said locking member is extending into the associated one of said sleeve members;

each of said leg members comprising a wheel portion, said wheel portion being positioned opposite said body member when that associated one of said leg members is coupled to said body member, said wheel of each of said leg members being adapted for rolling across the support surface for facilitating moving of said body member;

said perimeter wall of said body member comprising a plurality of intake apertures, each of said intake apertures extending through a bottom wall of said perimeter wall of said body member, each of said intake apertures being adapted for permitting air to be drawn into said interior space of said body member to supply the heat source with oxygen;

a plurality of damper assemblies being slidably coupled to said bottom wall of said perimeter wall of said body member, each of said damper assemblies being positioned proximate one of said intake apertures such that each of said damper assemblies is adapted for controlling the amount of air being drawn through the associated one of said intake apertures when each of said damper assemblies is actuated by the user;

each of said damper assemblies comprising a damper plate, said damper plate being sildably coupled to said bottom wall of said perimeter wall of said body member, said damper plate being selectively slid over the associated one of said intake apertures such that said damper plate is adapted for controlling the amount air being drawn through the associated one of said intake apertures when said damper plate is actuated by the user;

each said damper assemblies comprising a rod member and a damper handle member, said rod member being coupled to said damper plate of the associated one of said damper plates, said rod member slidably extending through said perimeter wall of said body member, said damper handle member being coupled to said rod member opposite said damper plate such that said damper handle member is adapted for being gripped by the user to allow the user to slide said damper plate to control the amount of air flowing through the associated one of said intake apertures;

a plurality of lifting handles being coupled to said perimeter wall of said body member, each of said lifting handles being adapted for being gripped by the hands of the user for lifting and transporting said body member;

a pair of shelf members being selectively coupled to said perimeter wall of said body member such that one of said shelf members is positioned opposite the other one of said shelf members, said gas control assembly being coupled to one of said shelf members, each of said shelf members being adapted for supporting articles used by the user when said shelf members are coupled to said body member;

a grate member being selectively positioned in said interior space of said body member, said grate member being adapted for supporting said burner member and the heat source in said interior space of said body member;

said body member comprising a plurality of rib members, each of said rib members being coupled to said bottom wall of said perimeter wall of said body member such that each of said rib members is positioned in said interior space of said body member, said rib members being positioned between said bottom wall and said grate member such that said rib members are for positioning said grate member in a spaced relationship from said intake apertures for allowing air to flow to said burner member and the heat source; and a separating plate being selectively inserted into said interior space of said body member, said separating plate being adapted for separating the heat source from said burner member when said separating plate is positioned in said interior space.

* * * * *